United States Patent
Harada et al.

(10) Patent No.: US 7,064,094 B2
(45) Date of Patent: Jun. 20, 2006

(54) HIGHLY DURABLE SILICA GLASS, PROCESS AND APPARATUS FOR PRODUCING SAME, AND MEMBER AND APPARATUS PROVIDED WITH SAME

(75) Inventors: Yoshinori Harada, Sagamihara (JP); Shuzo Mizutani, Fujisawa (JP); Shinkichi Hashimoto, Sagamihara (JP); Masakazu Kudoh, Yamagata (JP); Naoki Miura, Yamagata (JP); Katsufumi Takahashi, Sakata (JP); Hideki Kiyohara, Tokuyama (JP)

(73) Assignees: Tosoh Corporation, Yamaguchi (JP); Tosoh Quartz Corporation, Yamaguchi (JP); Tosoh SMG Corporation, Yamaguchi (JP)

( * ) Notice: Subject to any disclaimer, the term of this patent is extended or adjusted under 35 U.S.C. 154(b) by 0 days.

(21) Appl. No.: 10/718,575

(22) Filed: Nov. 24, 2003

(65) Prior Publication Data

US 2004/0116269 A1    Jun. 17, 2004

Related U.S. Application Data (62) Division of application No. 10/105,270, filed on Mar. 26, 2002, now abandoned.

(30) Foreign Application Priority Data

| Mar. 26, 2001 | (JP) | .............................. 2001-87082 |
| Jun. 1, 2001 | (JP) | .............................. 2001-166307 |
| Jun. 1, 2001 | (JP) | .............................. 2001-166311 |

(51) Int. Cl.
*C03C 3/06* (2006.01)
(52) U.S. Cl. ......................... 501/54; 118/718
(58) Field of Classification Search .................. 501/54; 118/715
See application file for complete search history.

(56) References Cited

U.S. PATENT DOCUMENTS

| 5,532,195 A | 7/1996 | Weiss et al. |
| 5,631,522 A | 5/1997 | Scott et al. |
| 6,429,577 B1 | 8/2002 | Kiryu et al. |

*Primary Examiner*—J. Lorengo
*Assistant Examiner*—Elizabeth A. Bolden
(74) *Attorney, Agent, or Firm*—Sughrue Mion, PLLC (57) ABSTRACT

Highly durable silica glass containing 0.01% to 2% by weight of at least one element selected from magnesium, calcium, strontium, barium, yttrium, hafnium and zirconium. The silica glass is produced by melting a powdery material comprising a finely divided silica powder and a finely divided zirconium-containing substance by oxyhydrogen flame or plasma are to form an accumulated molten material layer, and extending the molten material layer outwardly in radial directions.

12 Claims, 6 Drawing Sheets

HIGHLY DURABLE SILICA GLASS, PROCESS AND APPARATUS FOR PRODUCING SAME, AND MEMBER AND APPARATUS PROVIDED WITH SAME

This disclosure is a divisional application of application Ser. No. 10/105,270, filed Mar. 26, 2002, now abandoned and hereby incorporated by reference.

BACKGROUND OF THE INVENTION (1) Field of the Invention

This invention relates to highly durable silica glass, and a process and an apparatus for producing the highly durable silica glass. The highly durable silica glass contains a plasma resistance-enhancing element substantially uniformly dispersed therein and exhibits an enhanced resistance to plasma applied in an apparatus using a plasma such as a semiconductor-production apparatus or a liquid crystal-production apparatus.

This invention further relates to a member such as a vessel for a semiconductor, a tool or jig, or a bell jar for a plasma etcher, which member is provided in a semiconductor production apparatus or a liquid crystal production apparatus; and to a semiconductor production apparatus or a liquid crystal production apparatus.

(2) Description of the Related Art

A production apparatus using a plasma is widely used, for example, as a semiconductor production apparatus and a liquid crystal production apparatus. In recent years, there is an increasing importance in a dry etching technique using a plasma along with micro-miniaturization of semiconductor integrated circuits. In the dry etching technique using a plasma, a halogen-containing compound gas such as a fluorine-containing compound gas or a chlorine-containing compound gas must be used. In view of high reactivity, a halogen-containing compound gas and its plasma are widely used, for example, as etching gas for dry etching or as cleaning gas in a thermochemical vapor deposition process. Many kinds of halogen-containing compound gas are used which include, for example, fluorine-containing compound gas such as HF, $CF_4$, $CHF_3$ and $NF_3$, chlorine-containing compound gas such as $Cl_2$, HCl, $BCl_3$ and $CCl_4$, and bromine-containing compound gas such as $Br_2$ and HBr.

In apparatuses using a plasma, such as a semiconductor production apparatus and a liquid crystal production apparatus, a silica glass member is popularly equipped. For example, a bell jar or a focus ring, which is made of transparent silica glass is used. This is because a raw material for silica, i.e., a high-purity quartz powder is not expensive and silica glass is easy to machine and is easily molten by oxyhydrogen flame. Therefore, a shaped high-purity silica glass article having a complicated shape can be produced with a low production cost. Further, silica glass exhibits enhanced high-frequency transmittance.

However, a silica glass member has a problem in durability. That is, when a silica glass member is repeatedly exposed to a halogen-containing compound gas or a plasma thereof, the surface layer thereof is gradually etched and the section thickness to reduced. For example, a fluorine-containing plasma such as $CF_4/O_2$ is used, silicon in the silica glass is allowed to react with fluorine radical to form $SiF_4$ which is evaporated. The reduction of section thickness shortens the service life of silica glass member and tends to cause abnormal discharge.

For a member which is exposed to a high temperature such as a flange of a semiconductor-production apparatus, a high-purity opaque silica glass is used because of excellent heat insulation. However, a conventional opaque silica glass has fine bubbles formed therein for enhancing opaqueness and thus, the surface is rough, and the silica glass has poor sealability and poor toughness and exhibits poor impact resistance when it is exposed to plasma etching gas at high temperature.

SUMMARY OF THE INVENTION

In view of the foregoing, an object of the present invention is to provide silica glass exhibiting improved durability while high purity, good machinability and reduced production of a powdery substance are maintained, which suitable as a member equipped in an apparatus using a halogen-containing compound gas and its plasma such as a semiconductor-production apparatus or a liquid crystal apparatus.

Another object of the present invention is to provide a process for producing a rod of highly durable silica glass, by which a rod of the highly durable silica glass can be efficiently produced.

Still another object of the present invention is to provide an apparatus used for the highly durable silica glass rod.

A further object of the present invention is to provide a silica glass member made of the highly durable silica glass and suitable for a device such as a vessel for semiconductor, a jig and a tool, and a bell jar for a plasma etcher, used in an apparatus using a halogen-containing compound gas and its plasma, such as a semiconductor-production apparatus or a liquid crystal-production apparatus.

A further object of the present invention is to provide a semiconductor-production apparatus or a liquid crystal-production apparatus, which is equipped with a silica glass member made of the above-mentioned highly durable silica glass.

In one aspect of the present invention, there is provided highly durable silica glass comprising 0.01% to 2% by weight, based on the weight of the silica glass, of at least one element selected from the group consisting of magnesium, calcium, strontium, barium, yttrium, hafnium and zirconium.

In another aspect of the present invention, there is provided a silica glass member for use in an apparatus using a halogen-containing compound gas and a plasma thereof; said member being made of the above-mentioned highly durable silica glass.

In still another aspect of the present invention, there is provided a semiconductor-production apparatus equipped with a silica glass member made of the above-mentioned highly durable silica glass.

In a further aspect of the present invention, there is provided a liquid crystal-production apparatus equipped with a silica glass member made of the above-mentioned highly durable silica glass.

In a further aspect of the present invention, there is provided a process for producing a highly durable silica glass ingot comprising simultaneously falling a finely divided silica powder and a finely divided zirconium-containing substance in a furnace using oxyhydrogen flame as heat source to form an accumulated layer of zirconium-containing silica on a bottom of the furnace; and extending the accumulated layer outwardly in radial directions, to form an ingot wherein zirconium is uniformly dispersed in a silica glass matrix.

In a further aspect of the present invention, there is provided an apparatus for producing a highly durable silica glass ingot comprised of silica and zirconium, wherein zirconium is uniformly dispersed in a silica glass matrix, said apparatus comprising (i) a furnace rotatable round its own axis, (ii) a feed means for allowing a finely divided silica powder and a finely divided zirconium-containing substance to simultaneously fall within the furnace, said feed means being fitted on a top of the furnace; and (iii) a burner for projecting oxyhydrogen flame, said burner being fitted on a top of the furnace.

In a further aspect of the present invention, there is provided a process for producing a highly durable silica glass ingot comprising allowing a powdery material comprising a finely divided silica powder and a finely divided zirconium-containing substance to pass through a plasma arc-coupled region whereby the powdery mixture Is molten; and collecting the molten material; said plasma arc-coupled region being formed by coupling at least two plasma arcs generated by at least two electrodes having different polarities.

BRIEF DESCRIPTION OF THE INVENTION

DETAILED DESCRIPTION OF PREFERRED EMBODIMENTS

The present invention will be described In detail.
Highly Durable Silica Glass

The highly durable silica glass of the invention contains 0.01% to 2% by weight, based on the weight of the highly durable silica glass, of at least one element selected from the group consisting of magnesium, calcium, strontium, barium, yttrium, hafnium and zirconium (which element is hereinafter referred to "additive element" when appropriate).

The additive element has a function of enhancing the durability of silica glass as used while the silica glass is exposed to a halogen-containing compound gas and its plasma. More specifically, a halogenated compound of the additive element has a sublimation temperature and a boiling point, both of which are much higher than those of a halogenated compound of $SiO_2$, i.e., $SiCl_4$. Therefore, the rate of sublimation of the halogenated compound of additive element under vacuum is much smaller than that of the halogenated compound of silica glass. Further, the additive element exhibits a rate of etching greatly lower than that of silica glass. That is, when the additive-containing silica glass is exposed to a halogen-containing compound gas and its plasma over a long period of time, the additive element is etched only at a much lower rate than that of silica glass. Thus, the additive element is gradually deposited on the surface or the concentration of additive element is increased with a progress of etching. The deposited or concentrated additive element prevents the silica glass from being brought into contact with a halogen-containing compound gas and its plasma with the results that the durability of silica glass as used in a halogen-containing compound gas and its plasma is enhanced.

Among the additive elements incorporated in the silica glass of the invention, zirconium is especially preferable because its oxide is very stable and a zirconium-containing silica glass gives a baneful influence only to a minimum extent during the process of producing semiconductor.

The content of additive element in the silica glass of the invention is in the range of 0.01% to 2% by weight, preferably 0.05% to 0.5% by weight, based on the weight of the additive-containing silica glass. When the content of additive element is too high, the mechanical strength becomes poor and the silica glass is liable to be broken at a step of cutting or grinding. Further, when zirconium is incorporated, transparency of the silica glass is decreased with an increase of amount of zirconium added. In contrast, when the content of additive element is too low, the durability the durability of silica glass as used in a halogen-containing compound gas and its plasma is not enhanced. The silica glass containing the additive element in the above-mentioned amount exhibits good and well-balanced durability and mechanical strength. Further, when zirconium is incorporated in the above-mentioned range, a transparent silica glass exhibiting a transmittance of visible light of at least 80% at a thickness of 1 mm can be obtained.

If elements other than the above-mentioned additive element used in the present invention are incorporated in silica glass, a problem arises. For example, aluminum gives a fluoride having a sublimation temperature higher than that of $SiX_4$ (X: halogen) when aluminum is exposed to a fluorine-containing compound gas and its plasma, but its chloride has a low sublimation temperature of about 180° C. Sodium and copper tend to contaminate a semiconductor. Scandium is expensive.

It is to be noted that, if a ceramic member comprised of an element selected from the above-mentioned additive elements is used as a member in a semiconductor- or liquid crystal-producing apparatus, the ceramic member gives a baneful influence on semiconductor or liquid crystal because it contains sodium and other impurities. Further, the ceramic has grain boundaries and thus erosion occurs at the grain boundaries and grains are liable to be fallen from the ceramic member. Therefore the highly durable silica glass of the present invention is beneficial in this respect as compared with the ceramic member.

The highly durable silica glass of the present invention is vitreous. In the highly durable silica glass, a region surrounding each additive element particle is preferably vitreous, but, only this region may be crystalline.

The highly durable silica glass has preferably no bubble nor grain boundary, and is preferably densified. This is because erosion tends to occur at the boundary and bubble with the result of reduction in section thickness and mechanical strength.

The additive element is preferably dispersed in a silica glass matrix as uniform as possible for manifesting a maximum durability. Especially preferable is zirconium-containing silica glass having a variant coefficient of zirconium concentration as measured on plural micro-regions each having a size of 200 μm×200 μm by an EPMA (X-ray micro analyzer) in the range of 0.1% to 100%. The variant coefficient is defined by the following equation:

Variant coefficient(%)=σ/C×100 wherein σ is standard deviation and C is concentration of zirconium. The measurement is made on, for example, at least five micro-regions, each of which has a size of, for example, 200 μm×200 μm.

The highly durable silica glass of the invention is suitable for use as a member provided in an apparatus using a halogen-containing compound gas and a plasma thereof. The apparatus includes a dry etching apparatus, a semiconductor-producing apparatus and a liquid crystal-producing apparatus. As specific examples of the halogen-containing compound, there can be mentioned fluorine-containing compounds such as HF, $CF_4$, $CHF_3$ and $NF_3$, chlorine-containing compounds such as $Cl_2$, HCl, $BCl_3$ and $CCl_4$, and bromine-containing compounds such as $Br_2$ and HBr.

The shape and surface state of the highly durable silica member is not particularly limited. However, as for a part which is subject to erosion due to a halogen-containing compound gas and its plasma, the part should preferably have a smooth surface, i.e., a reduced surface roughness by polishing or fire polishing Process for Producing Highly Durable Silica Glass The highly durable silica glass of the present invention can be made from a powdery silica material and an additive element-containing compound. More specifically the highly durable silica glass is made by melting together a finely divided powdery silica material and a finely divided additive element-containing substance. A finely divided powdery silica material and a finely divided additive element-containing substance are fed as a mixed powder or separately for melting together. Alternatively, a finely divided powdery silica material having deposited thereon an additive element-containing substance can be used as silica source and additive element source.

As specific examples of the silica source, there can be mentioned natural silica materials such as powdery natural quartz, natural silica, silica sand, α-quartz and cristobalite, and synthetic silica materials such as those made by a process wherein a silicon alkoxide is hydrolyzed in the presence of hydrochloric acid or an ammonia catalyst, and the obtained silica is calcined; or a process wherein an aqueous alkali metal silicate solution is allowed to react with an acid and the obtained silica is purified and calcined; fumed silica, and soot silica. Of these, high-purity silica materials such as silica sand, rock crystal powder, α-quartz and cristobalite are preferable.

The high-purity silica materials preferably have an average particle diameter in the range of 70 μm to 500 μm. When synthetic silica is used, the synthetic silica preferably has a particle diameter distribution ranging from 40 μm to 430 μm and a mode diameter of about 220 μm because good compactness is obtained and dusting is minimized. The powdery silica materials can be classified into a narrower particle diameter. For example, classified particles with particle diameter distribution ranging from 200 μm to 300 μm and a mode diameter of about 260 μm; reclassified particles with particles diameter distribution not larger than 200 μm and a mode diameter of about 180 μm can be used. The powdery silica materials preferably have uniform pores having a diameter as small as possible in view of dispersibility of an additive element.

The additive element-containing compound is used as a finely divided powder or in a form deposited on finely divided powdery silica material. The additive element-containing compound includes those which are capable of being converted to an oxide upon calcination. Preferably the additive element-containing compound is a salt such as nitrate, chloride or sulfate.

Finely divided powdery silica material having deposited thereon the additive element-containing compound is prepared, for example, by dissolving a salt of an additive element in water or other liquid medium to prepare a solution, or dispersing an oxide of an additive element to prepare a slurry, and then incorporating powdery silica material in the solution or slurry, followed by evaporating the liquid medium from the solution or slurry with stirring. The thus-prepared powdery silica material has a salt or oxide of the additive element deposited on fine silica particles. If an oxide of the additive element is not thoroughly mixed with powdery silica material and is agglomerated in the slurry, the oxide of additive element is not uniformly deposited on the fine silica particles, and the resulting highly durable silica glass is liable to have poor transparency.

To enhance compatibility of an additive element with silica glass or enhance bonding of an additive element with silica glass to improve press-forming property, a trace amount of an element other than the above-mentioned additive elements can be used in combination with an additive element-containing compound and a finely divided silica powder. For example, a trace amount of aluminum can be used.

When zirconium is used as an additive element, transparency of the highly durable silica glass is liable to be reduced with an increase in amount of zirconium, and the silica glass is not suitable for eight glass. To improve the transparency, a solid solution of zirconium in silica glass must be formed by employing a high melting temperature of at least 2,150° C. The solid solution can also be formed by enhancing the contact area of zirconium with silica or by incorporating a trace amount of aluminum.

The process for preparing the highly durable silica glass of the present invention will be more specifically described with regard to a preferred embodiment wherein a finely divided zirconium substance is used as an additive element-containing substance.

The highly durable silica glass is made by melting together a finely divided powdery silica material and a finely divided zirconium-containing substance. The melting method includes an oxyhydrogen flame melting method, a plasma melting method or an electrical melting method.

(1) Oxyhydrogen Flame Melting Method

In a process for producing a highly durable silica glass ingot employing an oxyhydrogen flame melting method, a furnace using oxyhydrogen flame as heat source and preferably capable of being rotated is used. That is, a finely divided silica powder and a finely divided zirconium-containing substance are simultaneously fallen in a furnace using oxyhydrogen flame as heat source to form an accumulated layer of zirconium-containing silica on a bottom of the furnace; and extending the accumulated layer outwardly in radial directions, to form an ingot wherein zirconium is uniformly dispersed in a silica glass matrix.

The finely divided silica powder and the finely divided zirconium-containing substance are fallen as a mixture of the silica powder and the zirconium-containing substance, or separately. Alternatively, a finely divided silica powder having deposited thereon a zirconium-containing substance is fallen. The fallen finely divided silica powder and zirconium-containing substance are contacted with oxyhydrogen flame to form an accumulated layer of molten zirconium-containing silica on a bottom of a furnace, and the accumulated zirconium-containing silica layer is maintained at a temperature sufficiently high for keeping the accumulated zirconium-containing silica layer in a molten state to be thereby extended outwardly in radial directions.

The finely divided silica powder used as silica source in the oxyhydrogen flame melting method is preferably a finely divided powder of high-purity silicon oxide. More preferably the finely divided silica powder is a finely divided powder of high-purity silicon oxide selected from silica sand, rock crystal powder, α-quartz and cristobalite.

The zirconium-containing substance is preferably selected from metallic zirconium, and zirconia and other zirconium compounds. Of these, zirconia is preferable. As specific examples of the zirconium compounds, there can be mentioned zirconium salts such as zirconium chloride, zirconium nitrate and zirconium oxychloride; zirconia made by a process wherein zircon sand is purified, the resulting zirconium oxychloride is dissolved in pure water, and the aqueous solution is dried and then calcined; zirconia made by a process wherein zirconium hydroxide is calcined; and zirconia made by a hydrolyzing method. Of these, zirconia made by a hydrolyzing method is especially preferable.

The finely divided zirconium-containing substance preferably has an average particle diameter in the range of 0.1 μm to 300 μm.

The amount of finely divided zirconium-containing substance used is such that the weight of zirconium is in the range of 0.01% to 2% by weight, based on the weight of the sum of the finely divided silica powder and the finely divided zirconium-containing substance.

Figure 1:
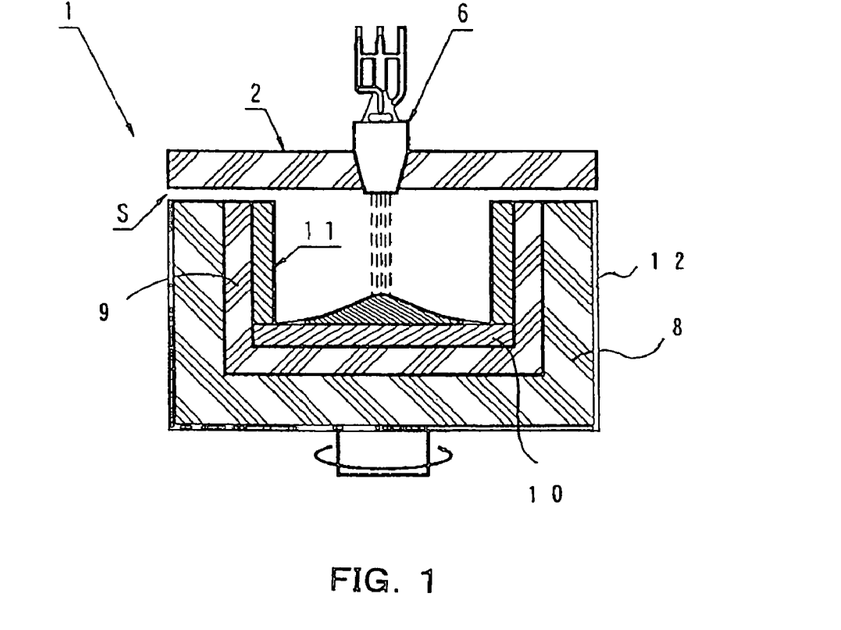
FIG. 1 is a schematic illustration of section f a furnace used for producing an ingot of zirconium-containing silica glass of the present invention.
Figure 2:
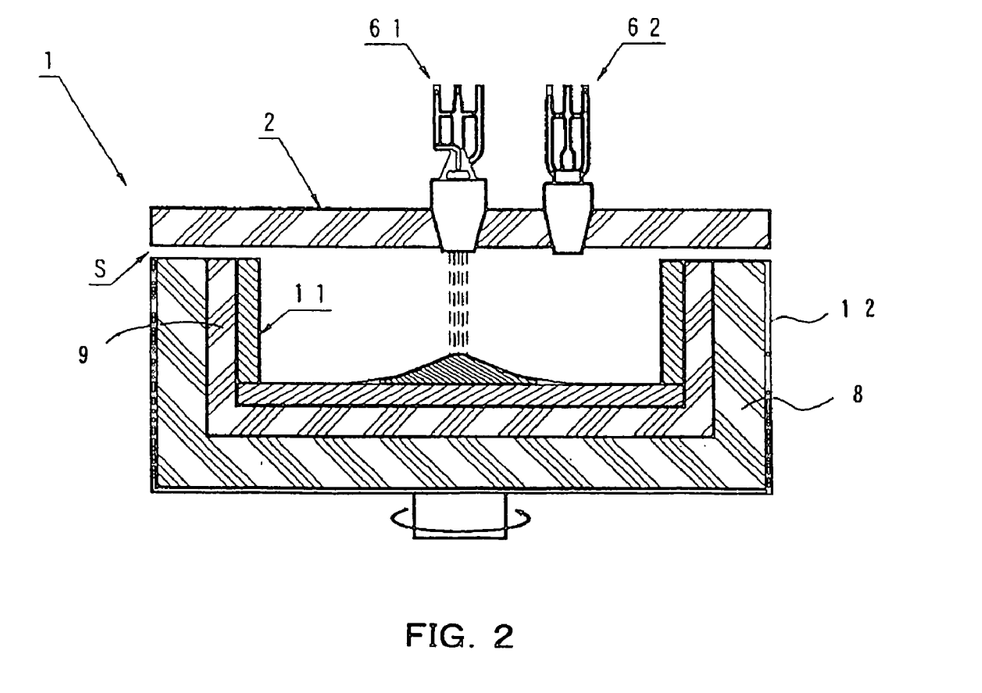
FIG. 2 is a schematic illustration of section of another furnace used for producing an ingot of zirconium-containing silica glass of the present invention.

FIG. 1 is a schematic illustration of section of a furnace used for producing an ingot of zirconium-containing silica glass of the present invention by the oxyhydrogon flame method, and FIG. 2 is a schematic illustration of section of another furnace used for producing the zirconium-containing silica glass ingot of the present invention by the oxyhydrogen flame method.

In FIG. 1, a furnace 1 used is rotatable round its own axis. More specifically, a frame 12 supporting the furnace 1 is rotated by a motor. Alumina bricks 8 are laid on the frame 12. Silicon carbide bricks form a side-wall defining the outer configuration of an ingot of highly durable silica glass of the present invention. The side-wall 11 is surrounded by porous alumina bricks 9 and the alumina bricks 8 for heat insulation. The upper end of furnace 1 is open, and a lid 2 is placed on the upper end edge of furnace 1 with a gap s between the upper end edge of furnace 1 and the lid 2. The lid 2 is made of heat-resistant bricks such as alumina bricks, porous bricks or zirconia bricks. The lid 2 has a hole for fitting the burner assembly 6 therein and a peep hole (not shown).

As heat-insulating bricks used for the furnace 1, magnesia bricks such as MgO—Al$_2$O$_3$ bricks and basic refractories such as CaO cannot be used because these materials do not have heat-resistance sufficient for withstanding a high temperature at which zirconium-containing silica glass is melted, or these materials react with molten silica glass. Neutral refractories such as Al$_2$O$_3$ bricks have high heat resistance, but are not used as refractory placed in contact with molten silica glass because of reactivity with molten silica glass.

Silicon carbide refractory has high heat resistance and high mechanical strength, and silica glass can be easily separated therefrom. Therefore, silicon carbide refractory is suitable for side-wall 11 which is directly in contact with molten silica glass. Silicon carbide bricks made with a silicon oxide (SiO$_2$) binder or a silicon nitride (Si$_3$N$_4$) binder are preferable. Silicon carbide bricks made with a silicon nitride (Si$_3$N$_4$) binder, i.e., silicon nitride-bound silicon carbide bricks comprised of 80% by weight of SiO$_2$ and 20% by weight of Si$_3$N$_4$ are especially preferable.

The refractory bricks used for the furnace 1 are preferably baked prior to the fitting in furnace 1 so that metal impurities and fine fragments on the brick surface are removed. If fine fragments remain on the brick surface, minute bubbles are formed within molten silica glass, and the resulting zirconium-containing silica glass becomes opaque.

A furnace bottom is exposed to heat derived from the oxyhydrogen flame. Therefore zirconia bricks such as ZrO$_2$—SiO$_2$ bricks are preferably used as material constituting the surface of furnace bottom 10. However, zirconia bricks are liable to react with molten silica and sometimes give a cracked ingot or an ingot becomes difficult to separate from the furnace. Therefore the surface of furnace bottom 10 is preferably covered with heat-resistant zirconia particles (not shown) having a diameter in the range of 2 mm to 10 mm so that a zirconium-containing silica is not directly contacted with the bricks on the bottom and the zirconium-containing silica glass can be easily separated from the furnace. The thickness of the heat-resistant zirconia particles may be varied depending upon the state of the bottom surface, but is usually about 10 mm.

An accumulated layer of molten zirconium-containing silica formed on the furnace bottom is maintained at a temperature sufficiently high for extending the molten silica outward in radial directions by heat of oxyhydrogen flame.

As illustrated in FIG. 2, when a highly durable silica glass ingot having a large size is produced, an auxiliary burner 62 is provided in addition to the main burner assembly 61 in the lid of furnace 1 for giving heat sufficient for extending the molten zirconium-containing silica outward in radial directions. If desired, two or more auxiliary burners may be provided.

The direction in which oxyhydrogen flame of the auxiliary burner 62 is directed may not be vertical but is chosen so that uniform temperature distribution is obtained over the entire furnace. The auxiliary burner 62 is preferably inclined by 5 to 15 degrees from the vertical axis in a fashion such that the lower end of auxiliary burner 62 is directed forward in the rotating direction, to avoid disturbance of burnt gas.

Figure 3:
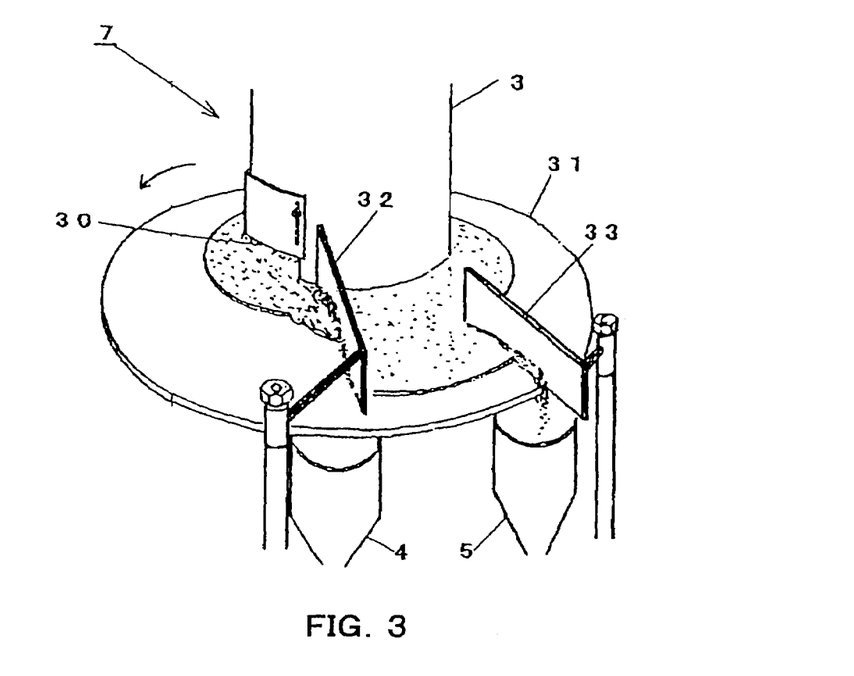
FIG. 3 is a perspective view of a feed means provided in an apparatus for producing an ingot of zirconium-containing silica glass of the present invention.

FIG. 3 is a perspective view of a powder feed means for allowing a finely divided silica powder and a finely divided zirconium-containing substance to simultaneously fall within the furnace 1. The powder feed means is provided above the furnace 1 so that the lower end of the powder feed means is combined in a burner assembly 6.

The powder feed means comprises at least one powder feed assembly 7. The or each powder feed assembly 7 comprises, as illustrated in FIG. 3, first a hopper 3 for feeding a powdery material which is the finely divided silica powder or the finely divided zirconium-containing substance or a mixture of the two powders, or a zirconium-containing substance-deposited finely divided silica powder. The first hopper 3 is oscillated so as to avoid blockage of the hopper with powder. The first hopper 3 has an opening 30 at the lower end thereof. The size of opening 30 is variable so that the fed rate of powder is controlled. The powder feed assembly 7 further comprises a rotatable table 31 for receiving the powdery material fed through the opening 30 of the first hopper 3. On the rotatable table 31, an equalizer 32 for extending and making uniform in height a heap of the powdery material is fitted. There is a gap between the lower edge of equalizer 32 and the upper surface of table 31. The size of the gap is adjustable.

The powdery material fed from the first hopper 3 forms a heap on the table 31, which impinges on the equalizer 32 whereby the heap of powdery material is extended and its height is made uniform. An excessive portion of the powdery material (not shown) falls from the outer periphery of table 31 into a second hopper 4 for recovery, and then is returned to the first hopper 3. A scraper 33 is provided downstream from the equalizer 32 on the table 31 whereby the powdery material having a uniform height is moved outward along the length of scraper 33 and falls from the table 31 into a third hopper 5. The scraper 33 extends from the vicinity of the center of table 31 to the outer periphery of table 31. The amount of powdery material which falls into the third hopper 5 is monitored by a dotting recorder, and is controlled by varying the length of scraper 33, the rate of rotation of table 31, and the gap between the lower edge of equalizer 32 and the upper surface of table 31. The powdery material which has fallen into the third hopper 5 is fed to the burner assembly 6 shown in FIG. 1. The feed rate of powdery material is usually in the range of 0.1 kg/hr to 10 kg/hr, preferably 0.3 kg/hr to 3 kg/hr.

When the powdery material is a mixture of a finely divided silica powder and finely divided zirconium-containing substance, or a finely divided silica powder having deposited thereon finely divided zirconium-containing substance, a single powder feed assembly 7 is used. When a finely divided silica powder and finely divided zirconium-containing substance are separately fed to the burner assembly 6, two powder feed assemblies are used.

Figures 4A, 4B:
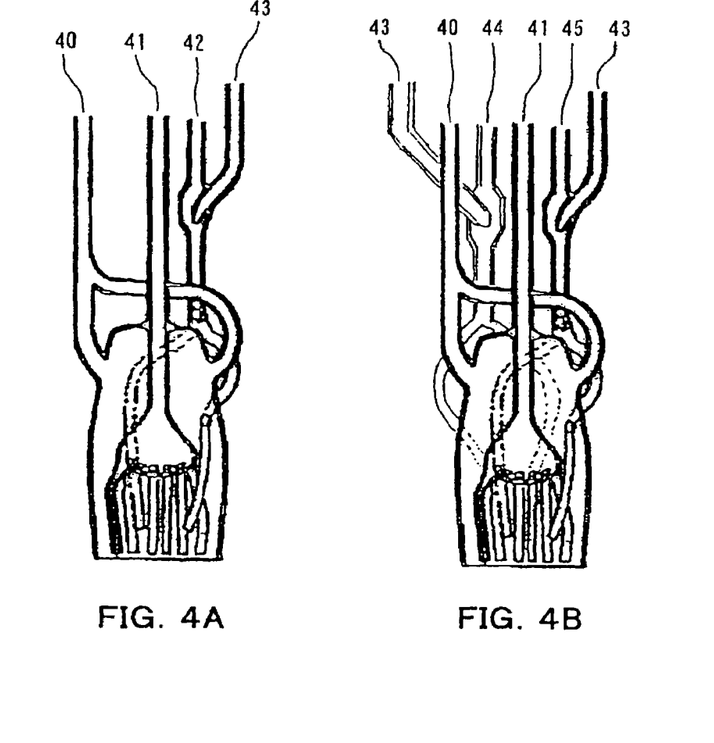
FIG. 4A is a sectional view of a burner provided in an apparatus for producing an ingot of zirconium-containing silica glass of the present invention.
FIG. 4B is a sectional view of another burner provided in an apparatus for producing an ingot of zirconium-containing silica glass of the present invention.

FIG. 4A is a sectional view of a burner assembly fitted to the lid of a furnace using oxyhydrogen flame, wherein a finely divided silica powder having deposited thereon a finely divided zirconium substance is fed. FIG. 4B is a sectional view of another burner assembly fitted to the lid of a furnace using oxyhydrogen flame, wherein a finely divided silica powder and a finely divided zirconium substance are separately fed.

In FIG. 4A, hydrogen 40 and oxygen 41 are supplied through separate pipes into the burner assembly. A finely divided silica powder having deposited thereon a finely divided zirconium substance 42 is supplied together with a carrier gas 43. In FIG. 4B, hydrogen 40 and oxygen 41 are supplied through separate pipes into the burner assembly. A finely divided silica powder 45 is supplied together with a carrier gas 43, and a finely divided zirconium substance 44 is supplied together with a carrier gas 43. The burner assembly is fitted to the lid of furnace in a fashion that the lower end of burner assembly is downward projected (FIG. 1 and FIG. 2)

In FIG. 1 and FIG. 2, the lid 2 is placed on the furnace 1 with a gap s between the upper end edge of furnace 1 and the lid 2, and therefore the lid 2 is independent from rotation of the furnace 1. The lid 2 has one or more holes for fitting the burner assembly 6 or 61 and optional burner 62 therein and a peep hole (not shown). The burner assembly 6 or 61 is connected through a feeding pipe (not shown) to a hopper 5 of a powdery material feed means 7 (shown in FIG. 3). The burner assembly 6 or 61 receives a powdery material through the feeding pipe from the hopper 5 of the powdery material feed means. A means for oscillating the feeding pipe is preferably provided so as to avoid blockage of the feeding pipe.

The burner assembly 6 or 61 and the optional auxiliary burner 62 are ignited and the furnace 1 is rotated round its axis at a revolution rate in the range of 2 to 10 rpm. The furnace 1 is preferably pre-heated for 1 to 24 hours, more preferably 3 to 5 hours to remove impurities and fine fragments from the brick surfaces as mentioned above.

The powdery material feed means 7 (shown in FIG. 3) is operated to feed a silica powder having deposited thereon a zirconium-containing substance, or a mixture of a silica powder and a zirconium-containing substance, or a silica powder and a zirconium-containing substance separately to the main burner assembly 6 or 61, from which the powdery material is fallen to the furnace bottom while being melted. The accumulated molten zirconium-containing silica is extended outwardly in radial directions. The central part within the furnace 1 is maintained at a temperature of about 2,000° C., namely, higher than the melting point of silica glass, by the burner assembly 6 or 61 and the optional auxiliary burner 62, and further, the furnace 1 is rotated. Therefore, with an increase in height of the accumulated molten zirconium-containing silica, it is extended outwardly in radial directions. Thus, a zirconium-containing silica glass wherein zirconium is uniformly dispersed and which has no or only a trace amount of minute bubbles can be produced.

The distance between the burner assembly 6 or 61 and the upper surface of the accumulated molten zirconium-containing can be maintained at constant by gradually lowering the furnace 1. The furnace 1 can be rotated around its own axis located in the center or a vicinity thereof, whereby the furnace 1 is moved by about 50 mm to 150 mm in the horizontal direction. By the maintenance of constant distance between the burner assembly and the molten material and the rotation around its own axis, the molten material can be easily extended.

The molten zirconium-containing silica extended outwardly in radial directions reaches the side-wall 11, and an ingot having a shape defined by the side-wall is obtained. For example, four side-walls of the same size are arranged, an ingot having a cross-section of regular square with a size of 1,000 mm×1,000 mm and a thickness of 300 mm thickness can be obtained. When side-walls are arranged in a polygonal or round configuration, an ingot having a polygonal or round cross-section can be obtained.

When a predetermined amount of the powdery material is supplied from the feed means 7 to the furnace 1, the operation of feed means 7 is stopped. When the accumulated molten zirconium-containing silica is extended and the upper surface thereof becomes substantially flat, supply of hydrogen and oxygen is stopped and a fire is put out. After putting out a fire, the rotation of furnace 1 is stopped and side-wall bricks 11 are removed, and an ingot of highly durable silica glass is taken from the furnace 1.

(2) Plasma Melting Method

In a process for producing a highly durable silica glass ingot employing a plasma melting method, a powdery material comprising a finely divided silica powder and a finely divided zirconium-containing substance is allowed to pass through a plasma arc-coupled region whereby the powdery material is molten; and the molten material is collected. The plasma arc-coupled region is formed by coupling at least two plasma arcs generated by at least two electrodes having different polarities. The highly durable zirconium-containing silica glass made by this process is beneficial in that segregation of zirconium is not found in the zirconium-containing silica glass and the zirconium-containing silica glass has no or only trace amount of fine bubbles and impurities.

The powdery material used in this process includes a mixture of a finely divided silica powder and a finely divided zirconium-containing substance, and a finely divided silica powder having deposited thereon a finely divided zirconium-containing substance.

The finely divided silica powder used as silica source in the plasma melting method is preferably a finely divided powder of high-purity silicon oxide. More preferably, the finely divided silica powder is a finely divided powder of high-purity silicon oxide selected from silica sand, rock crystal powder, α-quartz and cristobalite.

The finely divided zirconium-containing substance preferably has an average particle diameter in the range of 0.1 μm to 300 μm, more preferably 10 μm to 80 μm.

The amount of finely divided zirconium-containing substance used is such that the weight of zirconium is in the range of 0.01% to 2% by weight, preferably 0.05% to 0.5% by weight, based on the weight of the sum of the finely divided silica powder and the finely divided zirconium-containing substance. If the zirconium content is smaller than 0.01% by weight, a desired plasma resistance cannot be obtained. In contrast, if the zirconium content exceeds 2% by weight, the zirconium-containing silica glass becomes opaque and has an undesirable surface configuration leading to reduction of impact resistance and mechanical strength.

The zirconium-containing substance used is preferably the same as those mentioned above as for the oxygen flame melting method. That is, the zirconium-containing substance is selected from metallic zirconium, and zirconia and other zirconium compounds. Of these, zirconia is preferable.

In the plasma melting method, the electrodes generating plasma arcs are arranged symmetrically and inclined relative to a path of the powdery material in a fashion that plasma arc-generating tips of the electrodes are inwardly directed, wherein the inclination angle of each electrode and the distance from the plasma arc-coupled region to the collected molten material are capable of being independently varied so that transmittance of a resulting highly durable silica glass ingot can be controlled.

At least one of the electrodes functions as a cathode and the other electrode or electrodes function as an anode. The cathode and the anode are inclined preferably to en extent such that an inclination angle from the perpendicular axis is in the range of 45 to 65 degrees or the angle between the cathode and the anode is in the range of 80 to 130 degrees. Preferably, the distance between the tips of cathode and anode is maintained within 100 mm, or the distance from the plasma arc-coupled region to the collected molten material is maintained within 100 mm, whereby a highly durable opaque silica glass ingot is produced. That is, the transparency of zirconium-containing silica glass can be controlled.

The thus-obtained opaque silica glass is advantageous over the conventional opaque silica glass which has fine bubbles. That is, the opaque silica glass of the present invention contains no or only a trace amount of fine bubbles and therefore has good and smooth surface configuration, and the cut surface such as, for example, a sealing surface of the flange part of a bell jar, exhibits good sealability. Further, the opaque silica glass of the present invention exhibits good resistance to plasma and is suitable for use as a member to be exposed to a plasma.

The molten material is collected beneficially in a target while th target is rotated round the vertical axis r upwardly moved in the vertical direction, or while the target is rotated round the vertical axis and, simultaneously therewith, is upwardly moved in the vertical direction. Thus, a columnar or shell-shaped zirconium-containing silica glass ingot having a large length can be obtained.

When the molten material is collected on a central part of the bottom of a vessel while the vessel is rotated round the vertical axis thereof, and the collected molten material is maintained at a temperature sufficiently high for allowing the collected molten material to extend outwardly in radial directions, a zirconium-containing silica glass ingot of a desired shape and large size can be obtained.

The highly durable zirconium-containing silica glass made by the plasma melting method is suitable for use as a member to be exposed to high-density halogen-containing gas and its plasma.

The plasma melting method will be described In more specifically by the following two embodiments with reference to the accompanying drawings.

(i) FIRST EMBODIMENT

Figure 5:
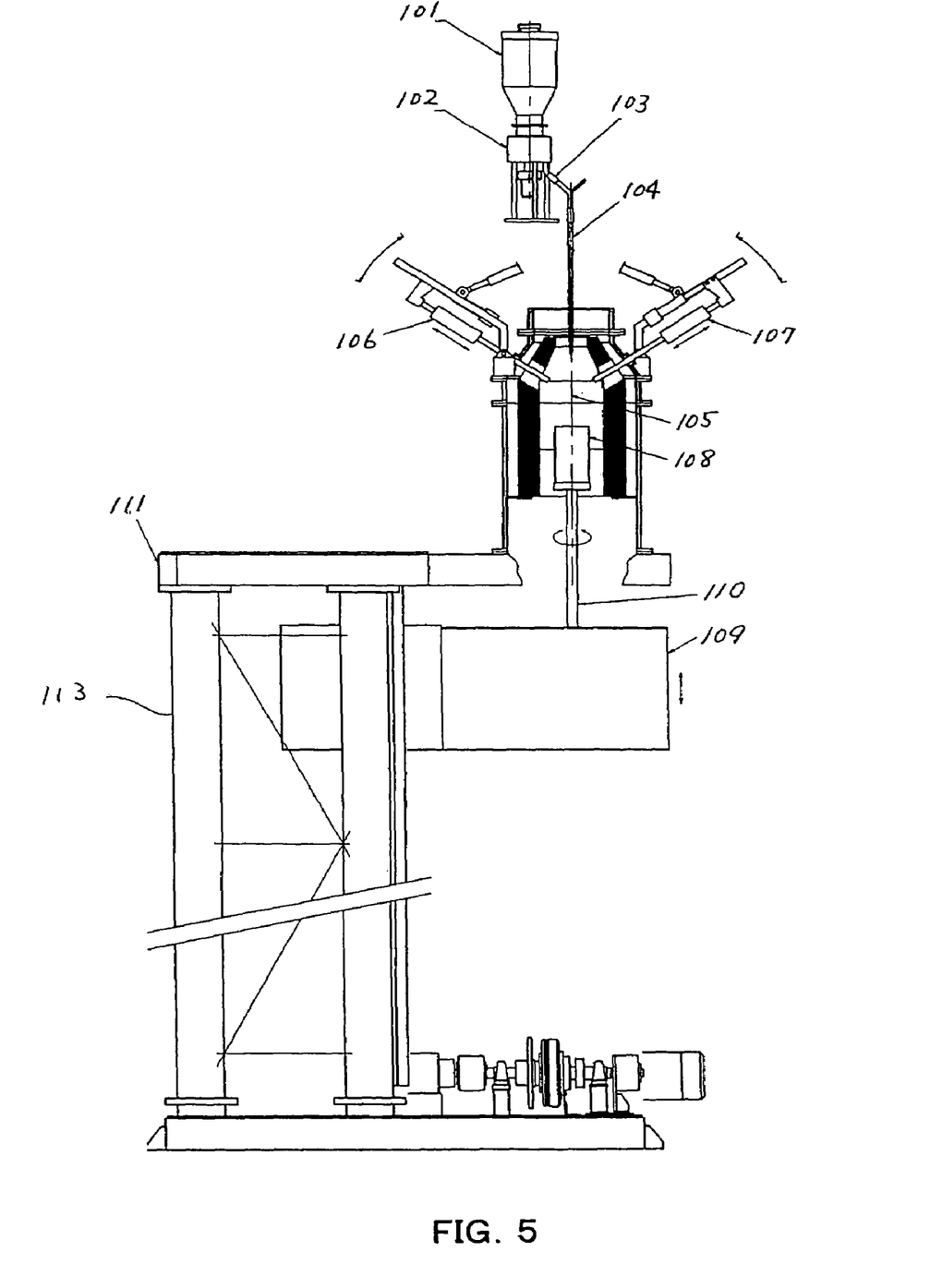
FIG. 5 is a partly sectional elevation of an apparatus using plasma melting for producing an ingot of zirconium-containing silica glass of the present invention.

In FIG. 5 which Is a partly sectional elevation of an apparatus using the plasma melting method, a hopper 101 is charged with a powdery material which is a mixture of a quartz powder having an average particle diameter of about 100 μm and a metallic zirconium powder having an average particle diameter of 50 μm (the amount of metallic zirconium powder is 0.67% by weight based on the sum of the quartz powder and the metallic zirconium powder). The hopper 101 is connected to a feed means 102. The powdery material is supplied from the hopper 101 to the feed means 102, and then to silica glass feed tubes 103 and 104. The powdery material passes through the tubes 103 and 104 to a plasma arc-coupled region 105.

Plasma arc is generated by a plasma anode torch 106 and a plasma cathode torch 107. The plasma anode torch 106 has an electrode exhibiting no ignition loss. The electrode is made of copper or other metal exhibiting no ignition loss. The zirconium-containing silica powder is melted below the plasma arc-coupled region 105 by heat generated by the plasma arc. A target 108 is provided underneath the region 105. The target 108 is rotatable on the vertical axis by a rotating mechanism 109. The target 108 is connected through a rotation shaft 110 with a lifting mechanism 111. Thus the target 108 can be moved upwardly and downwardly, if desired.

A supporting member 113 is provided so that the lifting mechanism 111 is stably operated. Usually the distance between the plasma arc-coupled region 105 and the target 108 is in the range of about 1 cm to about 20 cm. The angle between the anode torch 106 and the cathode torch 107 is in the range of 80° to 130°. The anode torch 106 and the cathode torch 107 are in alignment with each other. The angle between the anode torch 106 and the cathode torch 107 is variable, and the anode torch and the cathode torch are upward and downward movable so that registration can be effected. The anode torch 106 and the cathode torch 107 are positioned symmetrically relative to the vertical axis. By varying the angle between each electrode and the vertical axis and the distance between the plasma arc-coupled region and the target, the light transmittance of zirconium-containing silica glass can be varied within a broad range of from opaqueness to transparence.

The position of feed tube 104 also can be varied in a horizontal direction and in the vertical direction. The target is usually rotated at a rate of 1 to 60 rpm.

Figure 6:
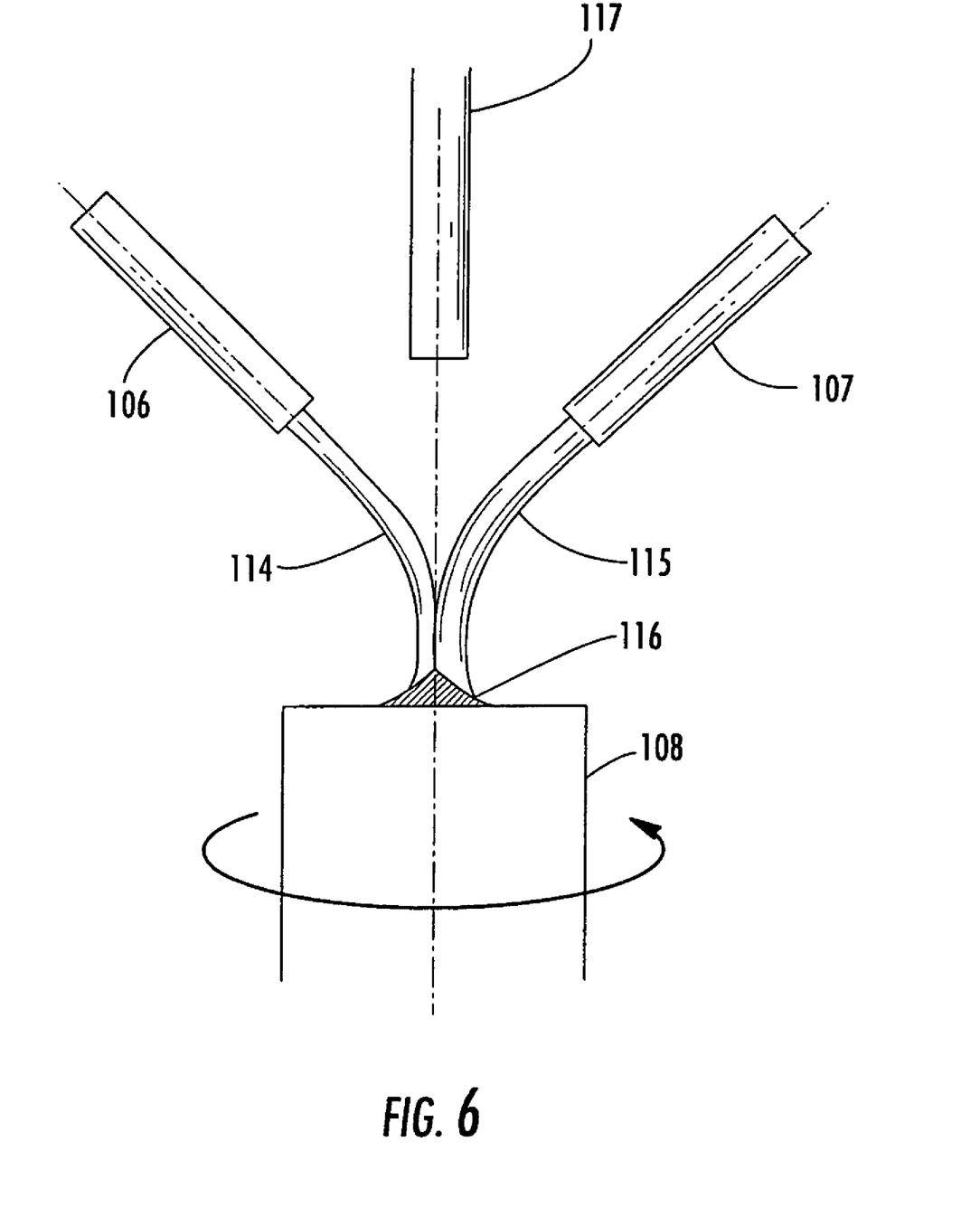
FIG. 6 is an enlarged schematic view illustrating growth of zirconium-containing silica glass.

As shown in FIG. 6 which is an enlarged schematic view illustrating growth of zirconium-containing silica glass, a powdery material falls through in a tube 117 into a plasma arc-coupled region where a plasma arc 114 generated by the plasma torch 106 and a plasma arc 115 generated by the plasma torch 107 are coupled. The zirconium-containing silica further falls to impinge upon the rotating target 108. Thus, a zirconium-containing silica glass ingot 116 is formed on the target 108.

With growth of the zirconium-containing silica glass ingot 116, a plasma arc-coupled region is stationarily formed on the zirconium-containing silica glass ingot 116. To obtain a stationary plasma arc-coupled coupled region on the ingot, the target 108 is downward moved by a lifting mechanism 111 (shown in FIG. 5). The rate of movement is usually in the range of 0.1 cm/min to 5 cm/min.

A current of 100 to 500 amperes at a voltage of 50 to 250 V is applied to each of plasma torches 106 and 107. An argon gas is preferably supplied at a flow rate of 10 to 60 liter/mm through each of plasma torches 106 and 107. The rate of mixed powder (quartz powder plus metallic zirconium powder) supplied is usually in the range of 0.5 to 20 kg/hour.

Figure 7:
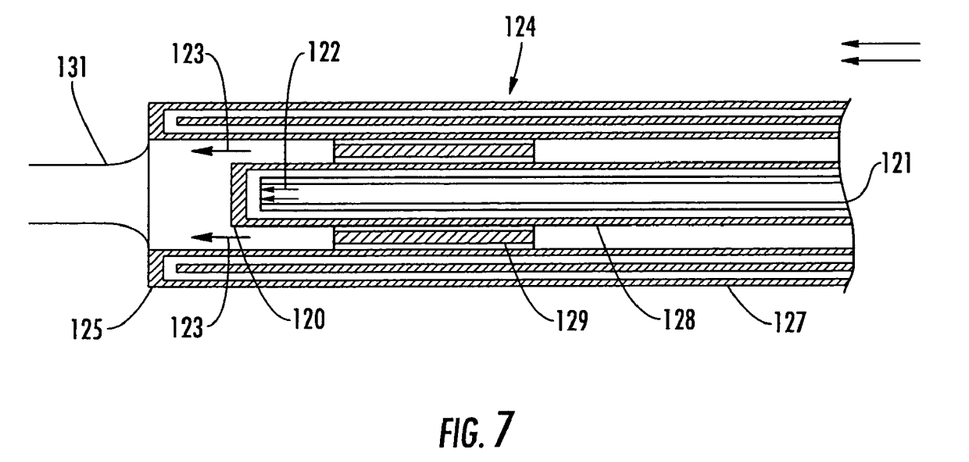
FIG. 7 is an enlarged partially sectional view of a plasma anode torch used in an apparatus using plasma melting for producing an ingot of zirconium-containing silica glass of the present invention.

FIG. 7 is an enlarged partially sectional view of a plasma anode torch 124 used in an apparatus using plasma melting method. In FIG. 7, the plasma anode torch has an electrode 120 exhibiting no ignition loss. The electrode 120 is made of copper or other metal exhibiting no ignition loss. The electrode 120 has a coaxial tube 121 therein. Cooling water flows through the tube 121 in the direction of arrow and flows back through the space between the tube 121 and the electrode 120. Plasma gas flows around the electrode 120 in the direction of arrow 123 and forms a plasma arc 131 which is ejected through a nozzle 125. A nozzle assembly 127 cooled with cooling water circulating therein has a function of limiting the plasma gas around the electrode 120. The nozzle 125 is electrically insulated by an insulating member 129 from an electrode assembly 128. The round end of the electrode 120 ensures an arc route and enables high-electric current passage and gives enhanced service life. Abrasion of the inner wall of the nozzle 125 is minimized and the contamination of zirconium-containing silica glass also is minimized by the round end of electrode 120.

Figure 8:
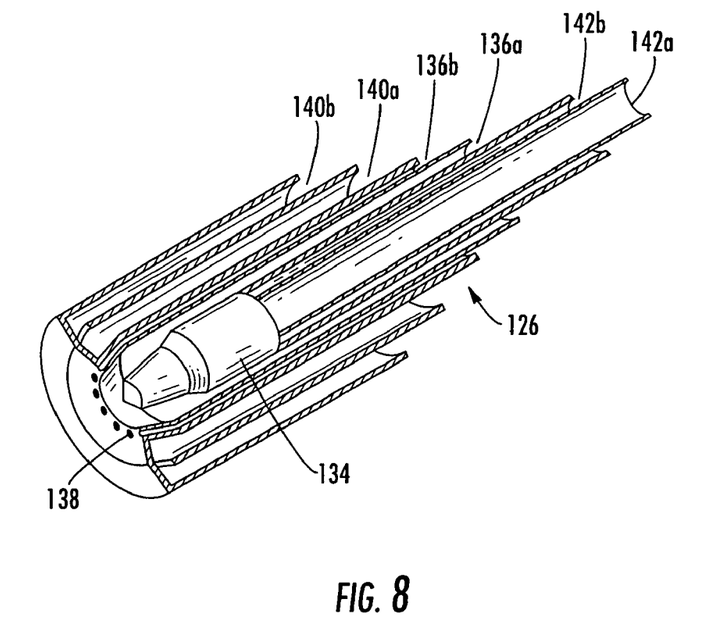
FIG. 8 is an enlarged partially sectional perspective illustration of a plasma cathode torch used in an apparatus using plasma melting for producing an ingot of zirconium-containing silica glass of the present invention.

FIG. 8 is an enlarged partially sectional perspective illustration of a plasma cathode torch 126 used in the apparatus using plasma melting method. In FIG. 8, argon gas flows through a space 136a surrounding a cathode electrode 134 to form an argon arc which is ejected from a torch nozzle. Nitrogen gas flows through a space 136b surrounding the cathode electrode 134 and is ejected through small holes 138. The small holes 138 are radially arranged at the top portion of torch nozzle, and are inwardly directed so that the ejected nitrogen gas streams are converged. The amount of nitrogen gas is usually in the range of 5% to 50%. The ejected nitrogen gas is ionized by argon arc and generates an argon-nitrogen plasma. Thus a plasma arc is formed highly efficiently, and an argon-nitrogen plasma is formed while tungsten constituting the cathode electrode 134 is not contacted with nitrogen gas. Therefore a reaction of tungsten with nitrogen can be avoided and the service life of the cathode electrode is improved. Cooling water is circulated from a space 140a to a space 140b for cooling the torch nozzle. Cooling water is circulated from a space 142a to 142b for insulating radiant heat from the plasma arc.

Thus, by using the above-mentioned plasma arc torch providing an arc plasma exhibiting stabilized orientation, high energy of the plasma is efficiently used, and the zirconium-containing silica glass ingot is produced with enhanced productivity. Further, the zirconium-containing silica glass ingot is not contaminated with fine fragments from the electrode material and has a high purity.

As a working example according to the first embodiment of the plasma melting method, two Kinds of zirconium-containing silica glass ingots were made, one of which was transparent and the other of which was opaque. A square plate having a size of 50 cm×50 cm was cut from each ingot, and was mirror-polished to prepare a test sample. Using a parallel flat plate-type plasma etching apparatus, the test specimen was subjected to plasma etching in a mixed $CF_4/O_2$ gas atmosphere. The change of the surface appearance and state was evaluated as observed before and after the etching. Surface roughness as observed on the conventional silica glass was not found and thus resistance to plasma was improved. The mechanical strengths as measured before and after the etching were the same, and there was no difference in mechanical strength between the transparent ingot and the opaque ingot.

(ii) SECOND EMBODIMENT

Figure 9:
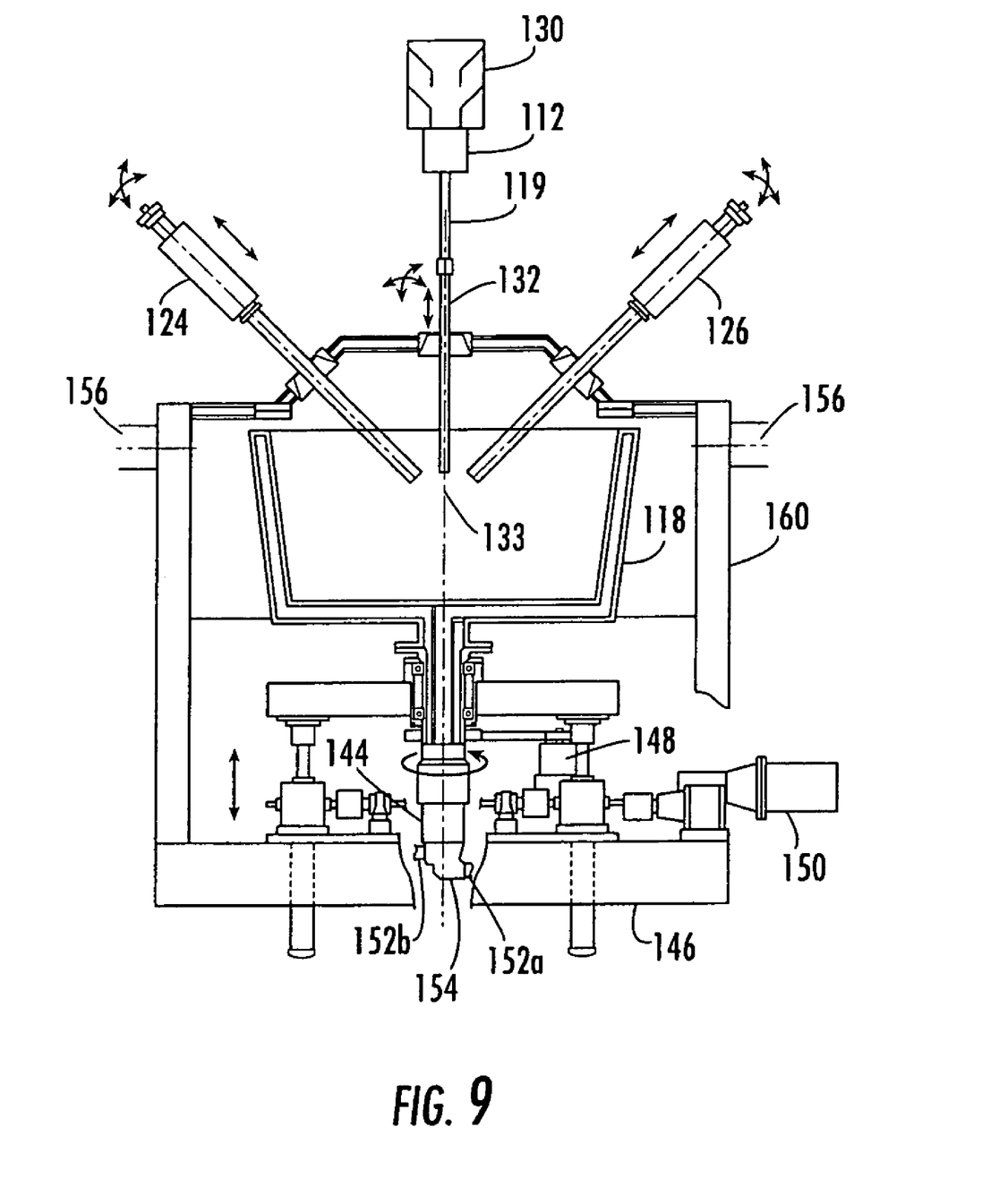
FIG. 9 is a partly sectional elevation of an apparatus using plasma melting for producing an ingot of zirconium-containing silica glass of the present invention.

In FIG. 9 which is a partly sectional elevation of another apparatus using the plasma melting method, a hopper 130 is charged with a powdery material which is a mixture of a finely divided silica powder and a finely divided zirconium-containing substance, or a finely divided silica powder having deposited thereon a finely divided zirconium-containing substance. The hopper 130 is connected to a constant-rate feeding means 112, a connecting tube 119 and a powdery material feeding tube 132. The powdery material is supplied from the hopper 130 through the feeding means 112 and the connecting tube 119 into a melting vessel 118 within a furnace 160. The position of melting vessel 118 can be shifted in the vertical direction and in the horizontal direction.

A twin plasma torch comprising a plasma anode torch 124 and a plasma cathode torch 126 is arranged in a manner such that the two plasma torches are symmetrically inserted in the furnace 160 relative to a plasma arc-coupled region 133. The torch angle and the depth of the plasma torches can be controlled. The plasma anode torch 124 and the plasma cathode torch 126 are inclined preferably to an extent such that an inclination angle from the perpendicular axis is in the range of 45 to 65 degrees and the distance in the horizontal direction between the lower ends of the two plasma torches is in the range of 50 to 100 mm. The plasma anode torch 124 has the same structure and function as those explained above in detail with reference to FIG. 7 as to the first embodiment. The plasma cathode torch 126 has the same structure and function as those explained in detail above with reference to FIG. 8 as to the first embodiment.

In FIG. 9, the melting vessel 118 is made of, for example, steel and can be cooled. The melting vessel 118 is supported by a rotating shaft 144. The melting vessel 118 is rotatable round its central axis. The melting vessel 118 may be eccentrically rotated round an axis slightly displaced from the center of vessel. The rotating shaft 144 is provided in a manner such that it can be rotated by a motor 148 and can be lifted by a motor 150, which motors are fitted on a furnace base 146. A rotary joint 154 having a cooling water inlet 152a and a cooling water outlet 152b is fitted to the lower end of the rotating shaft 144, thus cooling water being circulated in the melting vessel 118.

The ceiling part of the furnace 160 is flat and can be cooled by cooling water circulating therein. Silica vapor volatilizing from the molten silica in the melting vessel 118 flows upwardly and is exhausted through outlets 156 provided in side-wall.

Prior to an operation, the bottom surface of the melting vessel 118 is covered with silica particles having a large particle diameter at a thickness of about 1 cm to about 20 cm. The melting of the powdery material is effected in a plasma arc-coupled region 122 where plasma arcs generated from the plasma anode torch 124 and the plasma cathode torch 126 are coupled together to give heat sufficient for melting the powdery material. In an initial stage, the angle and position of the plasma anode torch 124 and the plasma cathode torch 126 are adjusted while the melting vessel 118 is rotated at a predetermined rate. The powdery material falls through the plasma arc-coupled region 122 to form a small heap of partly melted zirconium-containing silica on the center of the bottom covered with silica particles. The powdery material continually falls, while the adjustment of angle and position of the plasma anode torch 124 and the plasma cathode torch 126 are continued, to enlarge the heap of partly melted zirconium-containing silica. With an increase of the heap of partly melted zirconium-containing silica on the bottom covered with silica particles, the vessel 118 is downward moved so that the heap of partly melted zirconium-containing silica is maintained at a temperature sufficient for keeping a molten state. The molten zirconium-containing silica has a high viscosity and is of a mountain-shape having an outward extended circular foot. The molten zirconium-containing silica is maintained at a high temperature so that the silica is well extended to the side-wall of melting vessel 118. More specifically a stream of plasma generated by the twin plasma torches 124 and 126 covers the entire exposed surface of the mountain-shaped zirconium-containing silica whereby the molten material is extended to the peripheral side-wall to give an ingot wherein zirconium is uniformly dispersed in a silica glass matrix.

(3) Electrical Melting Method

In a process for producing a highly durable silica glass ingot, an electrical melting method can be employed (although not shown in the drawings). In a specific example, a finely divided powdery silica having deposited thereon a finely divided zirconium-containing compound is prepared, for example, by dissolving a salt of zirconium such as nitrate, sulfate or chloride in water or other liquid medium to prepare a solution, or dispersing an oxide of zirconium to prepare a slurry, and then incorporating powdery silica material in the solution or slurry, followed by evaporating the liquid medium at a high temperature from the solution or slurry with stirring. The thus-prepared powdery silica material has a zirconium salt or oxide deposited on fine silica particles. The powdery silica material is calcined at a temperature of 500° C. to 1,000° C. in an electric furnace to prepare a calcined product comprised of silica particles having deposited thereon zirconium oxide particles. Prior to the calcination, the powdery silica material may be molded together with an optional binder such as, for example, an acrylic resin into a molding. The calcined product is then baked at a temperature higher than the calcination temperature but lower than the melting point of cristobalite, namely at a temperature of 1,800° C. to 1,900° C. in an electric furnace to give a highly durable silica glass in which zirconium is uniformly dispersed.

The finely divided silica material used includes, for example, natural silica powder such as quartz powder, synthetic silica powder, fumed silica powder and soot silica powder. When synthetic silica is used, it preferably has a particle diameter distribution ranging from 40 μm to 430 μm and a mode diameter of about 220 μm because good compactness is obtained and dusting is minimized. The powdery silica materials can be classified into a narrower particle diameter. For example, classified particles with particle diameter distribution ranging from 200 μm to 300 μm and a mode diameter of about 260 μm; or classified particles with particles diameter distribution not larger than 200 μm and a mode diameter of about 180 μm are mentioned. The powdery silica materials preferably have uniform pores having a diameter as small as possible in view of dispersibility of an additive element.

The present invention will now be described by the following examples that by no means limit the scope of the invention.

EXAMPLES 1–21

Comparative Examples 1–8

A finely divided quarts powder having an average particle diameter of 200 μm was thoroughly mixed together with an oxide of an additive element (shown in Table 1) having an average particle diameter not larger than 5 μm. Each mixture was melted in an electric furnace under vacuum to give additive element-containing silica glass.

The concentration of each additive element in the mixture was measured by a method wherein the silica glass was dissolved by pressure acidolysis using hydrofluoric acid and the solution was quantitatively analyzed by the ICP atomic emission speotrochemical analysis.

A plate having a slide glass size was out from the additive element-containing silica glass. The plate was mirror-polished and then the polished surface was subjected to masking. The thus prepared sample was placed on an electrode of a parallel flat plate-type plasma etching apparatus where the sample was subjected to plasma etching in a mixed $CF_4/O_2$ gas atmosphere or a mixed $BCl_3/Cl_2$ gas atmosphere at 100 W for 1 hour. After etching, the mask was removed, and surface roughness of the masked area (non-etched area) and surface roughness of the etched area were measured for evaluation of resistance to plasma of silica glass. The test results were evaluated by comparing the surface roughness with that of control silica glass having therein no additive element, and expressed by assigning the following three ratings A, B and C. The test results are shown in Table 1.

A: Resistance to plasma was definitely larger than that of control silica glass.

B: Resistance to plasma was slightly larger than that of control silica glass.

C: Resistance to plasma was not larger than that of control silica glass.

A three-point bending test was carried out. The as-measured bending strength can be a criterion for processability of silica glass. The test results were evaluated by comparing the bending strength with that of control silica glass having therein no additive element, and expressed by assigning the following three ratings A, B and C. The test results are shown in Table 1.

A: Bending strength was the same as or only slightly lower than that of control silica glass.

B: Bending strength was reduced but the processability is still acceptable.

C: Bending strength was reduced to an extent such that the silica glass Is difficult to process.

The total evaluation results were expressed by the following three ratings.

A: Both ratings for plasma resistance and bending strength were A.

B: At least one of the ratings for plasma resistance and bending strength was B.

C: At least one of the ratings for plasma resistance and bending strength was C.

As seen from Table 1, plasma resistance, i.e., durablity of silica glass containing an additive element is enhanced with an increase in content of the additive element. When the content of additive element is smaller than 0.01% by weight, the plasma resistance is poor. When the content of additive element is at least 0.01% by weight, especially at least 0.05% by weight, the plasma resistance is satisfactory.

When the content of additive element exceeds about 0.50% by weight, the processability of silica glass is gradually deteriorated. When the content of additive element exceeds 2% by weight, the silica glass is liable to be broken at an abrading or polishing step or at a step of welding by oxyhydrogen flame. Thus, good and balanced processability and plasma resistance are obtained when the content of additive element is not larger than 2% by weight, more preferably not larger than 0.50% by weight.

TABLE 1

| | (1) Add. element | | (2) Plasma resist. | | (3) Bend. | (4) |
|---|---|---|---|---|---|---|
| Ex. No. | Kind | Conc. (wt. %) | $CF_4/O_2$ | $BCl_3/Cl_2$ | str. | Total |
| C1 | — | — | C | C | A | C |
| 1 | Mg | 0.048 | A | A | A | A |
| 2 | Mg | 1.100 | A | A | A | A |
| 3 | Ca | 0.013 | A | B | A | B |
| 4 | Ca | 0.047 | A | A | A | A |
| 5 | Ca | 0.132 | A | A | A | A |
| 6 | Ca | 1.880 | A | A | B | B |
| C2 | Ca | 4.700 | A | A | C | C |
| 7 | Sr | 0.048 | A | A | A | A |
| 8 | Sr | 1.100 | A | A | A | A |
| 9 | Ba | 0.051 | A | A | A | A |
| 10 | Ba | 0.960 | A | A | A | A |
| C3 | Y | 0.005 | C | C | A | C |
| 11 | Y | 0.012 | B | B | A | B |
| 12 | Y | 0.048 | A | A | A | A |
| 13 | Y | 0.460 | A | A | A | A |
| 14 | Y | 1.600 | A | A | B | B |
| C4 | Y | 5.400 | A | A | C | C |
| C5 | Zr | 0.006 | C | C | A | C |
| 15 | Zr | 0.011 | B | B | A | B |
| 16 | Zr | 0.053 | A | A | A | A |
| 17 | Zr | 0.494 | A | A | A | A |
| 18 | Zr | 1.010 | A | A | A | A |
| 19 | Zr | 1.900 | A | A | B | B |
| C6 | Zr | 4.700 | A | A | C | C |
| 20 | Hf | 0.061 | A | A | A | A |
| 21 | Hf | 0.970 | A | A | A | A |
| C7 | Al | 0.120 | A | C | A | C |
| C8 | Al | 5.300 | A | C | C | C |

Note,
"C" in Example No.: Camparative Example
(1) Add. element: additive element
(2) Plasma resistance as tested in an atmosphere of mixed $CF_4/O_2$ or $BCl_3/Cl_2$ gas
(3) Bending strength
(4) Total evaluation

EXAMPLES 22–25

Comparative Examples 9–16

A finely divided quartz powder having an average particle diameter of 200 μm was thoroughly mixed together with a zirconium oxide having an average particle diameter not larger than 5 μm. The mixture was melted by oxyhydrogen flame or in an electric furnace under vacuum to give zirconium-containing silica glass.

The concentration of zirconium in the mixture was measured by a method wherein the silica glass was dissolved by pressure acidolysis using hydrofluoric acid and the solution was quantitatively analyzed by the ICP atomic emission spectrochemioal analysis.

A plate having a thickness of 1 mm was prepared from the zirconium-containing silica glass. Both surfaces of the plate were mirror-polished to prepare a sample for testing light transmittance. The sample was irradiated with visible light with a wavelength of 600 nm by using a spectrophotometer "U-320" available from Hitachi, Ltd. to determine percentage of light transmittance. The test results were expressed by assigning the following two ratings.

A: Transmittance was at least 80%

B: Transmittance was smaller than 80%

A plate having a slide glass size was cut from the additive element-containing silica glass. The plate was mirror-polished and then the polished surface was subjected to masking. Using the thus prepared sample, plasma resistance was tested by the same method as that employed in Examples 1–21. The test results are shown in Table 2.

A three-point bending test was carried out by the same method as employed in Examples 1–21. The test results are shown in Table 2.

The total evaluation results were expressed by the following three ratings.

A: All of the ratings for plasma resistance, bending strength and light transmittance were A.

B: At least one of the ratings for plasma resistance, bending strength and light transmittance was B.

C: At least one of the ratings for plasma resistance, bending strength and light transmittance was C.

In Comparative Examples 15 and 16, aluminum oxide was used instead of zirconium oxide.

TABLE 2

| | (1) Add. element | | (2) Melt | (3) Plasma resist. | | (4) Bend. | (5) | (6) |
|---|---|---|---|---|---|---|---|---|
| Ex. No. | Kind | Conc. (wt. %) | temp. (° C.) | $CF_4/O_2$ | $BCl_3/Cl_2$ | str. | Trans. | Total |
| C9 | — | — | 1850 | C | C | A | A | C |
| C10 | Zr | 0.006 | 1850 | C | C | A | A | C |
| 22 | Zr | 0.011 | 1850 | B | B | A | A | B |
| 23 | Zr | 0.053 | 1950 | A | A | A | A | A |
| 24 | Zr | 0.494 | 2600* | A | A | A | A | A |
| C11 | Zr | 0.510 | 1950 | A | A | A | C | C |
| 25 | Zr | 0.570 | 2150 | A | A | A | A | A |
| C12 | Zr | 1.010 | 1850 | A | A | A | C | C |
| C13 | Zr | 1.900 | 1850 | A | A | B | C | C |
| C14 | Zr | 4.700 | 1850 | A | A | C | C | C |

TABLE 2-continued

| Ex. No. | (1) Add. element Kind | (2) Conc. (wt. %) | Melt temp. (° C.) | (3) Plasma resist. CF$_4$/ O$_2$ | BCl$_3$/ Cl$_2$ | (4) Bend. str. | (5) Trans. | (6) Total |
|---|---|---|---|---|---|---|---|---|
| C15 | Al | 0.120 | 1850 | A | C | A | A | C |
| C16 | Al | 5.300 | 1850 | A | C | C | A | C |

Note,
"C" in Example No.: Comparative Example
(1) Add. element: additive element
(2) Melt temp.: melting temperature (° C.) in an electric furnace under vacuum
*In Example 24, the temperature is a temperature of oxyhydrogen flame
(3) Plasma resistance as tested in an atmosphere of mixed CF$_4$/O$_2$ or BCl$_3$/Cl$_2$ gas
(4) Bending strength
(5) Light transmittance
(6) Total evaluation As seen from Table 2, plasma resistance, i.e., durability of zirconium-containing silica glass is enhanced with an increase of zirconium content. When the zirconium content is smaller than 0.01% by weight, the plasma resistance is poor. When the zirconium content is at least 0.01% by weight, especially at least 0.05% by weight, the plasma resistance is satisfactory.

When the zirconium content exceeds about 0.50% by weight, the processability of silica glass is gradually deteriorated. When the zirconium content exceeds 2% by weight, the silica glass is liable to be broken at an abrading or polishing step or at a step of welding by oxyhydrogen flame. Thus, good and balanced processability and plasma resistance are obtained when the zirconium content is not larger than 2% by weight, more preferably not larger than 0.50% by weight.

The temperature for melting the powdery material within oxyhydrogen flame in Example 24 was difficult to measure. But, the temperature of oxyhydrogen flame used was 2,600° C. and thus, it is believed that the powdery material was melted at this temperature. Where the powdery material was melted in an electric furnace under vacuum, if the zirconium content was 0.57% by weight (Example 25), a satisfactory light transmittance was obtained only when the melting temperature was at least about 2,150° C.

EXAMPLE 26

A quartz powder containing the ingredients shown in Table 3 and particle diameters ranging from 40 to 430 μm and a mode diameter of 219 μm was purified, and 223 g of the quartz powder was weighed.

TABLE 3

| | Ingredients | | | | | |
|---|---|---|---|---|---|---|
| | Al | Ca | Cu | Fe | Na | K | L1 |
| Content | 6.9 | 0.4 | <0.01 | 0.1 | 0.1 | 0.08 | 0.2 |

4.04 g of zirconium oxychloride (ZrCl$_2$O.8H$_2$O, purity 99.0%) was weighed, and dissolved in 150 ml of ultra-pure water having a specific resistance of 17 MQ·cm. This solution was mixed with the quartz powder and the mixture was allowed to stand for about 1 hour. The mixture was placed in a quartz boat, and heated in the air at 90° C. for 8 hours and then calcined at 500° C. for 1 hour. X-ray diffraction of the calcined product revealed that zirconium oxychloride was substantially converted to zirconia ZrO$_2$. The content of zirconium in a silica material to be treated was 5,000 ppm. The calcined product was free-flowing powdery material. A carbon mold composed of high-purity carbon was charged with the powdery material. A packing of charged powdery material had a cylindrical shape having a diameter of 90 mm and a height of 25 mm. The packing was melted in an electric furnace under vacuum. The temperature in the furnace was elevated from room temperature to 1,850° C. at a rate of 5° C./min, and maintained at 1,850° C. for 5 minutes. Thereafter the furnace was cooled in a nitrogen atmosphere. The content of zirconium in the thus-obtained zirconium-containing silica glass was measured by an electron probe micro analyzer. The results are shown in Table 4.

TABLE 4

| | Measurement points | | | | |
|---|---|---|---|---|---|
| | 1 | 2 | 3 | 4 | 5 |
| Zr content (atomic %) | 0.527 | 0.256 | 0.319 | 0.443 | 0.469 |

The average zirconium content was 0.403 atomic %, the standard deviation was 0.112 (atomic %), and the variant coefficient was 28%.

A plate sample was cut from the zirconium-containing silica glass, and was subjected to plasma etching in a mixed CF$_4$/O$_2$ gas atmosphere or a mixed BCl$_3$/Cl$_2$ gas atmosphere by the same procedure as employed in Examples 1–21 to evaluate plasma resistance. The plasma resistance was better than that of control silica glass containing no zirconium.

EXAMPLE 27

4.04 g of zirconium oxychloride (ZrCl2O.8H$_2$O, purity 99.0%) was weighed, and dissolved in 150 ml of ultra-pure water having a specific resistance of 17 MQ·cm. Fumed silica powder having an average particle diameter smaller than 1 μm was incorporated in this solution, and the mixture was stirred by a Teflon spoon. The mixture was allowed to stand for 2 hours, and then, placed in a quartz boat. Then, the mixture was heated in the air at 120° C. for 8 hours and then calcined at 500° C. for 1 hour. X-ray diffraction of the calcined product revealed that zirconium oxychloride was substantially converted to zirconia ZrO$_2$. The calcined product was free-flowing powdery material. The calcined product was malted in an electric furnace under vacuum to obtain zirconium-containing silica glass. The content of zirconium in the zirconium-containing silica glass was measured by an electron probe micro analyzer. The results are shown in Table 5.

TABLE 5

| | Measurement points | | | | |
|---|---|---|---|---|---|
| | 1 | 2 | 3 | 4 | 5 |
| Zr content (atomic %) | 0.112 | 0.131 | 0.134 | 0.141 | 0.146 |

The average zirconium content was 0.133 atomic %, the standard deviation was 0.013 (atomic %), and the variant coefficient was 10%.

A plate sample was cut from the zirconium-containing silica glass, and was subjected to plasma etching in mixed $CF_4/O_2$ gas atmosphere or a mixed $BCl_3/Cl_2$ gas atmosphere by the same procedure as employed in Examples 1–21 to evaluate plasma resistance. The plasma resistance was better than that of control silica glass containing no zirconium.

Comparative Example 17

A quartz powder containing the ingredients shown in Table 3 in Example 26 and particle diameters ranging from 40 to 430 μm and a mode diameter of 219 μm was purified, and 223 g of the quartz powder was weighed. 1.516 g of a zirconium oxide powder having a purity of 99.9% was weighed, and mixed in a dry state with the quartz powder for 2 hours by using a pot mill rotating base. The mixed powder was melted in an electric furnace under vacuum to obtain zirconium-containing silica glass. The content of zirconium in the zirconium-containing silica glass was measured by an electron probe micro analyzer. The results are shown in Table 6.

TABLE 6

|  | Measurement points | | | | |
| --- | --- | --- | --- | --- | --- |
|  | 1 | 2 | 3 | 4 | 5 |
| Zr content (atomic %) | 0.181 | 0.256 | 1.319 | 0.443 | 3.001 |

The average zirconium content was 1.040 atomic %, the standard deviation was 1.187 (atomic %), and the variant coefficient was 114%.

A plate sample was cut from the zirconium-containing silica glass, and was subjected to plasma etching in a mixed $CF_4/O_2$ gas atmosphere or a mixed $BCl_3/Cl_2$ gas atmosphere by the same procedure as employed in Examples 1–21 to evaluate plasma resistance. The plasma resistance was poor as compared with that of zirconium-containing silica glass in Example 22.

Comparative Example 18

A quartz powder containing the ingredients shown in Table 3 in Example 26 and particle diameters ranging from 40 to 430 μm and a mode diameter of 219 μm was purified, and 223 g of the quartz powder was weighed. 1.516 g of a zirconium oxide powder having a purity of 99.9% was weighed, and mixed in a dry state with the quartz powder for 4 days by using a pot mill rotating base. The mixed powder was melted in an electric furnace under vacuum to obtain zirconium-containing silica glass. The content of zirconium in the zirconium-containing silica glass was measured by an electron probe micro analyzer. The results are shown in Table 7.

TABLE 7

|  | Measurement points | | | | |
| --- | --- | --- | --- | --- | --- |
|  | 1 | 2 | 3 | 4 | 5 |
| Zr content (atomic %) | 0.231 | 1.562 | 3.021 | 0.006 | 4.002 |

The average zirconium content was 1.764 atomic %, the standard deviation was 1.737 (atomic %), and the variant coefficient was 98%.

A plate sample was cut from the zirconium-containing silica glass, and was subjected to plasma etching in a mixed $CF_4/O_2$ gas atmosphere or a mixed $BCl_3/Cl_2$ gas atmosphere by the same procedure as employed in Examples 1–21 to evaluate plasma resistance. The plasma resistance was poor as compared with that of zirconium-containing silica glass obtained in Example 22, but it was better than that obtained in Comparative Example 17.

As seen from the comparison of Comparative Example 18 with Comparative Example 17, even when the same zirconium-containing substance is incorporated in the same amount in quartz powder, if mixing is carried out thoroughly so that a highly dispersed mixture is obtained, the resulting zirconium-containing silica glass exhibits better plasma resistance.

EXAMPLE 28

Zirconium oxychloride was hydrolyzed by the conventional procedure to prepare a zirconia powder. The zirconia powder was combined with a finely divided quartz powder in a synthetic resin pot and was mixed together by using a ball mill mixer to prepare a powdery quartz/zirconia mixture containing 5,000 ppm of zirconium.

An apparatus shown in FIG. 2 equipped with a main burner assembly and an auxiliary burner, both of which were made of silica glass was used for melting the powdery quartz/zirconia mixture. The size of a melting chamber defined by silicon carbide bricks within the furnace was 750 mm×750 mm×400 mm.

10 kg of the powdery quartz/zirconia mixture was supplied in a feed hopper 3 shown in FIG. 3. The main burner and the auxiliary burner were ignited and the furnace was rotated at 5 rpm. The furnace was pre-heated, and then, the powdery quartz/zirconia mixture was supplied from the feed hopper 3 to the main burner at a rate of 2.0 kg/hr. The powdery mixture was melted by oxyhydrogen flame in the furnace while an additional powdery mixture was supplied to the hopper 3. Thus, 280 kg of the powdery mixture was supplied in total to the main burner, and then, operation of feed means was stopped. Further, heating by the main burner was continued for 4 hours whereby a molten material was extended outward in radial directions in the furnace. Finally, feeding of hydrogen and oxygen to the burners was stopped. After fire extinguishing, rotation of the furnace was stopped. The furnace was cooled and then side-wall bricks were removed to obtain zirconium-containing silica glass having a size of 750 mm×750 mm×180 mm.

The benefits and use of the highly durable silica glass of the present invention are summarized as follows.

An additive element such as zirconium is uniformly dispersed in the silica glass. The silica glass exhibits enhanced plasma resistance, i.e., enhanced durability when used as a member in a semiconductor-production apparatus or a liquid crystal-production apparatus. The silica glass has good processability and reduced fly of fine fragments, which are inherently possessed by conventional high-purity silica glass.

The silica glass is suitable as a member for use in an apparatus to which high plasma resistance and high heat resistance are required, such as a semiconductor-production apparatus or a liquid crystal-production apparatus. Such member includes, for example, jigs and tools such as a flange part of a reaction tube and a bell jar.

A silica glass ingot having a large size can be advantageously produced by the melting method using oxyhydrogen flame.

What is claimed is:

1. A silica glass member for use in a plasma reaction apparatus for producing a semiconductor or a liquid crystal display using a halogen-containing compound gas and a plasma thereof, which is composed of a silica glass consisting essentially of silica and 0.01% to 2% by weight, based on the weight of the silica glass, of at least one element selected from the group consisting of magnesium, calcium, strontium, barium, yttrium, hafnium and zirconium.

2. The silica glass member according to claim 1, wherein the content of said at least one element is in the range of 0.05% to 0.5% by weight based on the weight of the silica glass.

3. The silica glass member according to claim 1, wherein said at least one element is zirconium and the silica glass is transparent.

4. The silica glass member according to claim 1, wherein said at least one element is zirconium and the silica glass exhibits a variant coefficient of zirconium concentration as measured on plural micro-regions by an EPMA (X-ray micro analyzer) in the range of 0.1% to 100%; said variant coefficient being defined by the following equation:

Variant coefficient(%)=$\sigma/C \times 100$ wherein $\sigma$ is standard deviation and C is concentration of zirconium.

5. The silica glass member according to claim 1, which is a flange of a reaction tube.

6. The silica glass member according to claim 1, which is a bell jar.

7. A semiconductor-producing apparatus equipped with a silica glass member as claimed in claim 1.

8. The semiconductor-producing apparatus according to claim 7, wherein said silica glass member is a flange of a reaction tube.

9. The semiconductor-producing apparatus according to claim 7, wherein said silica glass member is a bell jar.

10. A liquid crystal-producing apparatus equipped with a silica glass member as claimed in claim 1.

11. The liquid crystal-producing apparatus according to claim 10, wherein said silica glass member is a flange of a reaction tube.

12. The liquid crystal-producing apparatus according to claim 10, wherein said silica glass member is a bell jar.

* * * * *

UNITED STATES PATENT AND TRADEMARK OFFICE
CERTIFICATE OF CORRECTION

PATENT NO.       : 7,064,094 B2                                     Page 1 of 1
APPLICATION NO.  : 10/718575
DATED            : June 20, 2006
INVENTOR(S)      : Yoshinori Harada et al.

It is certified that error appears in the above-identified patent and that said Letters Patent is hereby corrected as shown below:

On Title Page
Item (75) Inventors: should read

Yoshinori Harada, Sagamihara (JP);
Shuzo Mizutani, Fujisawa (JP);
Shinkichi Hashimoto, Sagamihara (JP);
Masakazu Kudoh, Yamagata (JP);
Naoki Miura, Yamagata (JP);
Katsufumi Takahashi, Sakata (JP)
~~Hideki Kiyohara, Tokuyama (JP)~~

Signed and Sealed this

Ninth Day of January, 2007

JON W. DUDAS
*Director of the United States Patent and Trademark Office*